June 25, 1940.  A. H. WHITE  2,205,840
DIELECTRIC MATERIAL
Filed April 20, 1937
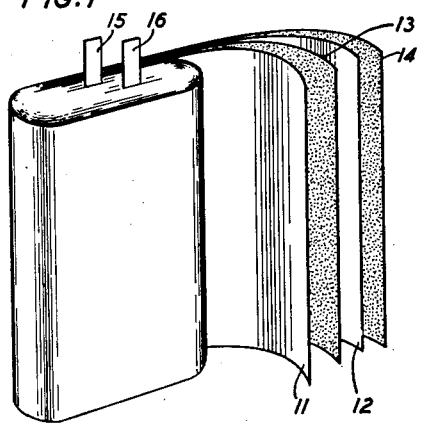
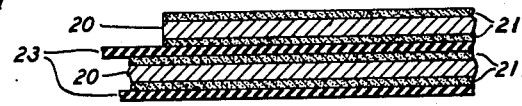
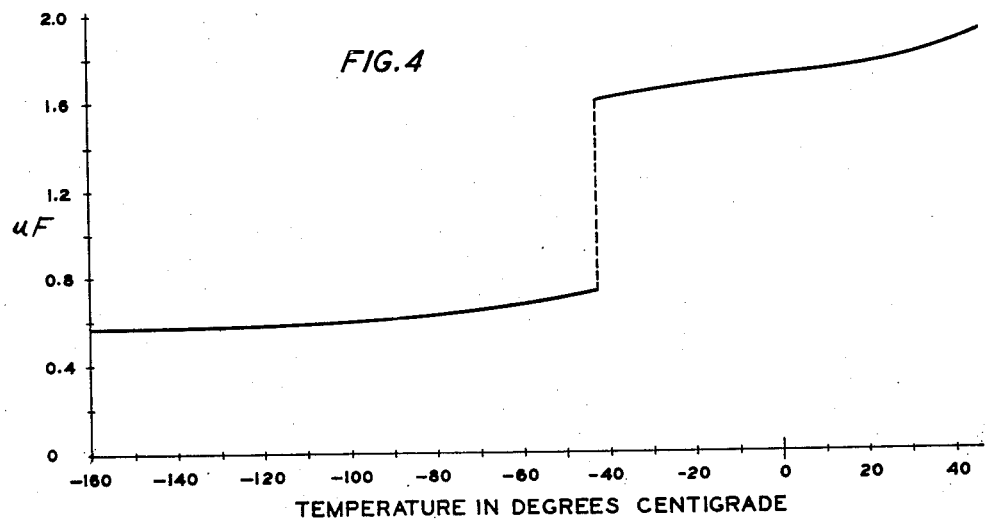
INVENTOR
A. H. WHITE
BY
*H. G. Bandfield*
ATTORNEY Patented June 25, 1940

2,205,840

UNITED STATES PATENT OFFICE 2,205,840

DIELECTRIC MATERIAL

Addison H. White, East Orange, N. J., assignor to Bell Telephone Laboratories, Incorporated, New York, N. Y., a corporation of New York Application April 20, 1937, Serial No. 137,917

9 Claims. (Cl. 154—2.6)

This invention relates to dielectric materials and more particularly to the use of succinonitrile as a dielectric for electrical apparatus.

For certain purposes, electrical apparatus is required which, while possessing the necessary characteristics for a particular use, must be so designed as to occupy a minimum of space. In telephone exchanges in large urban centers, for example, space is at a premium and reduction in the size of apparatus is of paramount concern to render service economically. Then, too, in airplanes and other mobile bodies, the space occupied by electrical apparatus is a most important consideration. Where these conditions prevail any diminution of the space occupied by apparatus such as condensers, which are employed in large quantities in telephone plants, effects marked economy.

An object of this invention is to reduce materially the size of electrical apparatus.

A more particular object of this invention is to utilize a condenser for electrical systems which operates efficiently and occupies a relatively small space.

In accordance with this invention succinonitrile is employed as a dielectric material for electrical apparatus. Succinonitrile or ethylene dicyanide, as it is sometimes named, has an extremely high dielectric constant—65.5 at room temperature—a higher dielectric constant at room temperature than any other waxy and solid organic material reported in the literature, and electrical apparatus in which it is employed occupies a relatively small space. The succinonitrile may be employed alone or in combination with other dielectric materials whether having similar or different physical and electrical characteristics. The succinonitrile is /adapted for use as wave guides, such as those disclosed in the copending applications of G. C. Southworth, Serial No. 661,154, filed March 16, 1933 and Serial No. 701,711, filed December 9, 1933, condensers and other electrical apparatus.

In a specific embodiment succinonitrile is employed as a dielectric for electric condensers. The succinonitrile is interposed between two plates of a condenser, or a porous dielectric such as paper is impregnated with succinonitrile and the paper placed between foil electrodes. The succinonitrile may be mixed with another dielectric. While the other dielectric may be either polar or non-polar, it is preferably miscible in all proportions with the succinonitrile.

A more comprehensive understanding of this invention is obtained by reference to the accompanying drawing in which:

Fig. 1 is an embodiment of this invention in which succinonitrile is employed as an impregnating medium for a paper condenser of the wound type;

Fig. 2 is a cross-sectional view of a modification of the invention in which succinonitrile is used jointly with another dielectric in a condenser of the stacked type;

Fig. 3 shows a cross-sectional view of another modification of this invention in which succinonitrile is employed alone as a dielectric for a condenser;

Fig. 4 is a graphical representation of the capacitance at various temperatures of the condenser shown in Fig. 1.

In Fig. 1 the condenser of the well-known wound type comprises two conducting metallic foil electrodes 11 and 12 between which are wound throughout the entire length thereof two porous strips of paper 13 and 14. Two metallic terminals 15 and 16 are connected respectively to the electrodes 11 and 12 and these terminals serve as connecting means to other electrical apparatus. The porous paper 13 and 14 is saturated with succinonitrile by any well-known method employed in the art to distribute uniformly this dielectric material between the metallic electrodes 11 and 12. A preferred method of impregnating the condenser consists in drying the condenser unit at a temperature of approximately 120° centigrade in vacuum at a pressure of approximately 7 millimeters for a period of about four hours. The temperature is rapidly lowered to 65° centigrade by means of dry ice without removing the vacuum and the unit is completely immersed in melted succinonitrile or ethylene dicyanide. The reduced pressure is maintained during the impregnation process for about fifteen minutes. The pressure is gradually increased to that of the atmosphere and the units are then removed from the succinonitrile. The units are allowed to cool and are encased in any well-known manner.

In the modification shown in Fig. 2 and Fig. 3 the succinonitrile as a coating 21 is applied directly on two conducting sheets 20—20. In Fig. 2 an insulated sheet 23 is inserted between adjacent coatings of the succinonitrile. The condensers shown in Figs. 2 and 3 are of the stacked type but any other type well known in the art may also be coated in this manner. Instead of coating the conductors 20—20 with the dielectric, compressed sheets of succinonitrile may be employed between the conducting sheets 20—20. Sheets prepared by subjecting the waxy succinonitrile to a ram pressure of 2500 pounds have been found satisfactory. In order to modify the physical and electrical characteristics of the dielectric, the succinonitrile or ethylene dicyanide may be mixed with other dielectric materials such as non-polar hydrocarbon compounds or other polar derivatives of hydrocarbons in the condensers shown in Figs. 1, 2 and 3, or the succinonitrile may be applied in the form of a solution in a solvent, such as benzene or acetone, and the solvent subsequently evaporated. For example, the condenser shown in Fig. 1 may be impregnated with a solution of succinonitrile in benzene and the solvent subsequently evaporated. Some of the polar derivatives of hydrocarbon which may be mixed with the succinonitrile are camphor, borneol, isoborneol, and camphoric anhydride. Non-polar hydrocarbon dielectric such as hydrocarbon waxes melting between 45° centigrade and 95° centigrade or ozokerite may be employed.

In Fig. 4 the capacitance over a temperature range of a standard condenser unit of the roll type, such as that shown in Fig. 1, is shown. A standard paper wound condenser unit impregnated with chlorinated naphthalenes, a commercial dielectric for condensers, has a capacitance of 1 microfarad and occupies a volume of 13.3 centimeters³. When the same unit having this volume is impregnated with succinonitrile, the capacitance varies with the temperature as appears in the graph Fig. 4. An examination of that chart reveals that at approximately −40° centigrade a transition in the dielectric properties of the capacitance occurs. The capacitance at 3 kilocycles increases at that temperature from approximately .74 microfarad to 1.60 and continues to increase to approximately 1.78 at 20° centigrade or room temperature and about 1.88 at 44° centigrade. The capacitance of condenser units impregnated with succinonitrile in the range of temperatures to which condensers are usually subjected is considerably greater than that of condensers impregnated with materials now in use, such as chlorinated naphthalenes. At room temperature a standard 1 microfarad paper condenser unit impregnated with succinonitrile and which occupies a volume of 13.3 cubic centimeters has a capacitance of 1.78 microfarads at 3 kilocycles.

The succinonitrile or ethylene dicyanide may also be employed in dielectric guides or other apparatus in which a material having a high dielectric constant is required.

While preferred embodiments of this invention have been illustrated and described, various modifications therein may be made without departing from the scope of the appended claims.

What is claimed is:

1. A dielectric element for electrical apparatus comprising succinonitrile.

2. A dielectric material for electrical apparatus comprising succinonitrile and a solid organic dielectric material.

3. A dielectric material for electrical apparatus comprising succinonitrile and a solid non-polar hydrocarbon dielectric material.

4. A dielectric material for electrical apparatus comprising succinonitrile and a solid polar derivative of a hydrocarbon.

5. A dielectric material comprising a porous dielectric impregnated with a solution of succinonitrile.

6. A dielectric element comprising, as a major constituent, succinonitrile.

7. In an electrical device, a dielectric comprising succinonitrile in a solid state.

8. In an electric condenser, a dielectric comprising succinonitrile in a solid state.

9. A condenser dielectric comprising paper impregnated with succinonitrile.

ADDISON H. WHITE.